US010801877B2

(12) United States Patent
Wahlin

(10) Patent No.: US 10,801,877 B2
(45) Date of Patent: Oct. 13, 2020

(54) ULTRASONIC FLUID MEASUREMENT CALIBRATION PROBE

(71) Applicant: The Boeing Company, Chicago, IL (US)

(72) Inventor: Sigvard Johann Wahlin, Bothell, WA (US)

(73) Assignee: The Boeing Company, Chicago, IL (US)

( * ) Notice: Subject to any disclaimer, the term of this patent is extended or adjusted under 35 U.S.C. 154(b) by 497 days.

(21) Appl. No.: 15/829,767

(22) Filed: Dec. 1, 2017

(65) Prior Publication Data
US 2019/0170564 A1 Jun. 6, 2019

(51) Int. Cl.
| | | |
|---|---|---|
| *G01F 25/00* | (2006.01) | |
| *B64D 37/00* | (2006.01) | |
| *G01F 23/296* | (2006.01) | |
| *G01N 9/36* | (2006.01) | |

(52) U.S. Cl.
CPC ....... *G01F 25/0061* (2013.01); *B64D 37/005* (2013.01); *G01F 23/2962* (2013.01); *G01F 23/2968* (2013.01); *G01F 23/2961* (2013.01); *G01N 9/36* (2013.01)

(58) Field of Classification Search
CPC .. G01F 25/0061; G01F 23/266; G01F 23/284; G01F 25/0076; G01F 23/0076; G01F 25/00; G01F 23/296; G01F 23/2962; G01F 23/2968; B64D 37/00; B64D 37/005
USPC ......................................................... 73/1.73
See application file for complete search history.

(56) References Cited

U.S. PATENT DOCUMENTS

| | | | | |
|---|---|---|---|---|
| 4,019,363 A | * | 4/1977 | Sanford ................. | G01D 18/00 73/1.73 |
| 5,277,054 A | * | 1/1994 | Campbell ........... | G01F 25/0061 73/1.73 |
| 5,428,984 A | * | 7/1995 | Jones .................. | G01F 23/2961 73/1.73 |
| 5,728,928 A | * | 3/1998 | Wisskirchen ........... | G01F 23/14 73/1.73 |
| 6,516,661 B1 | | 2/2003 | Spillman, Jr. et al. | |

(Continued)

FOREIGN PATENT DOCUMENTS

EP 1434039 A1 6/2004

OTHER PUBLICATIONS

Terzic et al., "Ultrasonic Fluid Quantity Measurement in Dynamic Vehicular Applications; Chapter 2", Springer International Publishing, 2013, 26 pages.

(Continued)

*Primary Examiner* — Peter J Macchiarolo
*Assistant Examiner* — Mohammed E Keramet-Amircolai
(74) *Attorney, Agent, or Firm* — Yee & Associates, P.C.

(57) ABSTRACT

An apparatus and method of calibrating an ultrasonic fluid measurement system using an ultrasonic fluid measurement calibration probe. A base of the probe comprises an ultrasonic transducer. A tube extends from the base. A first calibration target is attached to the tube at a first distance from the ultrasonic transducer and extends into an interior of the tube. An orifice is formed in the tube. The orifice extends through the tube from an exterior of the tube to the interior of the tube and along the tube wherein an edge of the orifice is at the first distance from the ultrasonic transducer.

20 Claims, 4 Drawing Sheets

(56) References Cited

U.S. PATENT DOCUMENTS

| | | | | |
|---|---|---|---|---|
| 2006/0053892 | A1* | 3/2006 | Georgeson | G01N 29/28 73/634 |
| 2006/0137429 | A1* | 6/2006 | Henschel | G01F 25/0061 73/1.73 |
| 2007/0089533 | A1* | 4/2007 | Englund | B64C 25/22 73/862.01 |
| 2007/0295056 | A1* | 12/2007 | Calabrese | G01F 23/266 73/1.73 |
| 2009/0282892 | A1* | 11/2009 | Sai | G01F 23/284 73/1.73 |
| 2012/0167660 | A1* | 7/2012 | Calcote | G01F 23/266 73/1.73 |
| 2012/0323503 | A1 | 12/2012 | Welle | |
| 2013/0174637 | A1* | 7/2013 | Yamada | G01F 25/0076 73/1.73 |
| 2014/0260521 | A1* | 9/2014 | Mcqueen | G01F 25/0061 73/1.73 |
| 2014/0326038 | A1* | 11/2014 | Fauveau | G01F 25/0061 73/1.73 |
| 2015/0027201 | A1* | 1/2015 | Minard | G01F 19/00 73/1.73 |
| 2015/0329221 | A1* | 11/2015 | Georgeson | G01N 29/0654 702/36 |
| 2016/0041025 | A1* | 2/2016 | Haynes | G01F 23/72 73/1.73 |
| 2016/0047687 | A1* | 2/2016 | Prakash | G01F 23/64 73/1.73 |
| 2016/0061646 | A1* | 3/2016 | Mestivier | G01F 23/14 73/1.73 |
| 2017/0212066 | A1* | 7/2017 | Thompson | H04N 5/2256 |

OTHER PUBLICATIONS

Ford; "Ultrasonic fuel gauging", Aircraft Engineering and Aerospace Technology, vol. 70 Issue: 3, pp. 203-205, 1998. abstract only, https://doi.org/10.1108/00022669810215800.

European Patent Office Extended Search Report, dated May 8, 2019, regarding Application No. 18209465.6, 9 pages.

* cited by examiner

ULTRASONIC FLUID MEASUREMENT CALIBRATION PROBE

BACKGROUND INFORMATION

1. Field

The present disclosure relates generally to ultrasonic fluid measurement. More particularly, the present disclosure relates to systems and methods for calibration of ultrasonic sensors for fluid measurement.

2. Background

Ultrasonic sensing uses ultrasonic transducers to transmit ultrasonic waves and to receive those ultrasonic waves reflected from an object. The time delay between transmission and reception of the ultrasonic waves may be used to determine the distance of the object from the ultrasonic transducer. Ultrasonic transducers may be used to determine the height or level of fluid in a container by reflecting an ultrasonic signal from the surface of the fluid in the container. For example, without limitation, ultrasonic sensing may be used for fuel gauging, to measure the level of fuel in a fuel tank on an aircraft or other vehicle.

An ultrasonic signal is influenced by the medium in which it is propagated. For example, the velocity of an ultrasonic signal, as well as its attenuation, depends on the characteristics of the medium in which the signal is propagated. Changes in temperature of a medium, for example, will alter the velocity of an ultrasonic wave in the medium. Since the velocity of sound in a medium varies with the temperature of the medium, the performance of an ultrasonic measurement system may be effected by changes in the temperature of the medium being measured. Along with temperature, other characteristics of a fluid, such as contamination, may affect the operation of an ultrasonic fluid measurement system.

Accurate calibration of an ultrasonic fluid measurement system for changing characteristics of the fluid being measured may be desirable. Therefore, there may be a need for a method and apparatus that take into account at least some of the issues discussed above, as well as other possible issues.

SUMMARY

In one illustrative embodiment, an apparatus comprises a base and a tube extending from the base. The base comprises an ultrasonic transducer. A first calibration target is attached to the tube at a first distance from the ultrasonic transducer and extends into an interior of the tube. An orifice is formed in the tube. The orifice extends through the tube from an exterior of the tube to the interior of the tube and along the tube wherein an edge of the orifice is at the first distance from the ultrasonic transducer.

In another illustrative embodiment, a method of making an ultrasonic fuel gauging calibration sensor probe comprises attaching a first calibration target to a tube at a first distance from an end of the tube and extending into an interior of the tube, forming an orifice in the tube, and attaching the end of the tube to a base comprising an ultrasonic transducer. The orifice extends through the tube from an exterior of the tube to the interior of the tube and along the tube wherein an edge of the orifice is at the first distance from the end of the tube.

In yet another illustrative embodiment, a method of calibrating an ultrasonic fuel gauging sensor system comprises placing an ultrasonic fuel gauging calibration sensor probe in a fuel tank, wherein the ultrasonic fuel gauging calibration sensor probe comprises a tube attached to a base comprising an ultrasonic transducer and a first calibration target attached to the tube at a first distance from an end of the tube and extending into an interior of the tube, mixing fuel from the fuel tank with fuel inside the tube via an orifice in the tube, wherein the orifice extends through the tube from an exterior of the tube to the interior of the tube and along the tube wherein an edge of the orifice is at the first distance from the end of the tube, activating the ultrasonic transducer to send an ultrasonic signal into the tube, analyzing the ultrasonic signal reflected from the first calibration target and detected by the ultrasonic transducer, and using the analyzed signal to calibrated the ultrasonic fuel gauging system.

The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives, and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account different considerations. For example, the illustrative embodiments recognize and take into account that existing ultrasonic fuel probes may be designed with fluid entry ports at the bottom of the probe. As a result, colder and higher density fluid in the probe tube may impact the ability of warmer and lower density fluid to enter the probe. Therefore, existing fluid quantity indicating systems may require a vehicle to remain idle for a long period of time in order to allow new high temperature fluid, such as fuel, to mix with existing cold fluid while vehicle tanks are being refueled.

Illustrative embodiments improve and enhance the capabilities of ultrasonic fluid quantity indicating systems. In accordance with illustrative embodiments, fluid is able to enter the probe through an orifice at a location other than the bottom of the probe. The orifice may be near the transducer in order to enhance the accuracy of the ultrasonic sensing system. The size and positions of the orifices may vary based on the system requirements and fluid. Illustrative embodiments may be used on various fluid quantity measurement systems such as fuel tanks, water tanks, waste tanks, and other such systems.

Figure 1:
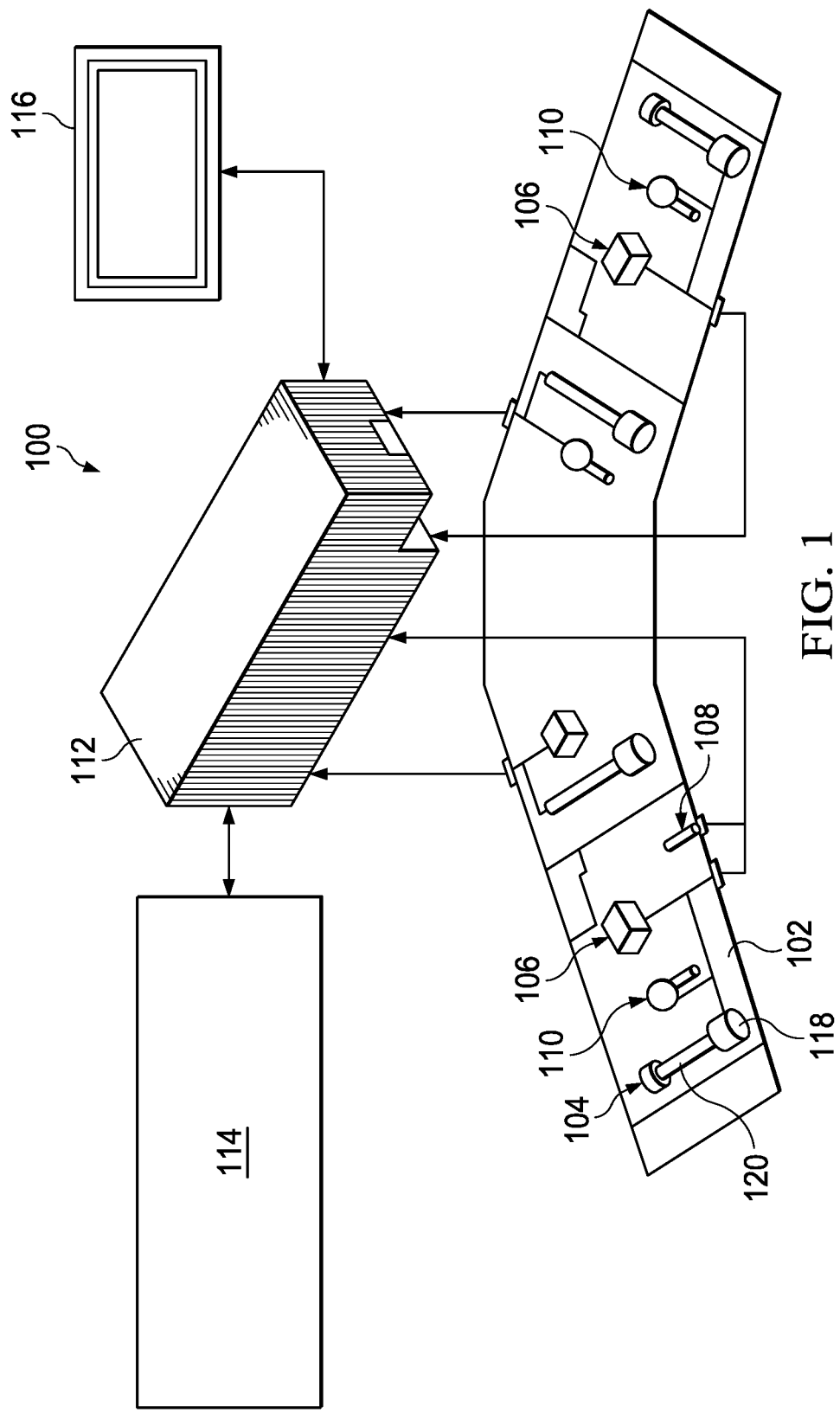
FIG. 1 is an illustration of a block diagram of an ultrasonic fuel gauging system in accordance with an illustrative embodiment.

Turning to FIG. 1, an illustration of a block diagram of an ultrasonic fuel gauging system is depicted in accordance with an illustrative embodiment. For example, without limitation, ultrasonic fuel gauging system 100 may comprise part of a fuel quantity indicating system for indicating the amount of fuel in fuel tanks 102 on an aircraft.

Ultrasonic fuel gauging system 100 may be configured to perform a variety of functions. For example, without limitation, ultrasonic fuel gauging system 100 may be configured to measure fuel quantity in fuel tanks 102, calculate the weight of fuel in fuel tanks 102, measure the temperature of the fuel in fuel tanks 102, control fueling operations, and show when there is water in fuel tanks 102.

Components of ultrasonic fuel gauging system 100 may include ultrasonic fuel sensor probes 104, densitometers 106, temperature sensors 108, and water detectors 110. Each ultrasonic fuel sensor probe 104 may comprise base 118 and tube 120. Base 118 of each ultrasonic fuel sensor probe 104 may comprise an ultrasonic transducer. Densitometers 106 measure the fuel density in each fuel tank 102.

Appropriate wiring may be used to connect ultrasonic fuel sensor probes 104 to fuel quantity processor unit 112. Fuel quantity processor unit 112 may send a signal to each ultrasonic fuel sensor probe 104 to find the fuel height. The ultrasonic fuel sensor probe 104 sends a sound pulse from base 118 at the bottom of fuel tank 102 to the fuel surface in tube 120 attached to base 118. Fuel quantity processor unit 112 calculates the fuel height by measuring the time it takes for the pulse to give a reflection back to the base.

Fuel quantity processor unit 112 may use the fuel height to calculate the fuel volume. Fuel quantity processor unit 112 may then multiply fuel volume and density to calculate the fuel weight. Fuel quantity processor unit 112 may send fuel quantity data to integrated refuel panel 114 and to display 116 on the flight deck of the aircraft.

The speed of the ultrasonic signal sent through the fuel in ultrasonic sensor probe 104 is dependent on fuel density and temperature. Densitometers 106 in each fuel tank 102 may be used to calculate fuel type during refueling. Some of ultrasonic sensor probes 104 may be calibration probes configured to calibrate the calculations of fuel height based on the information provided by other ultrasonic sensor probes 104 in fuel tanks 102.

Figure 2:
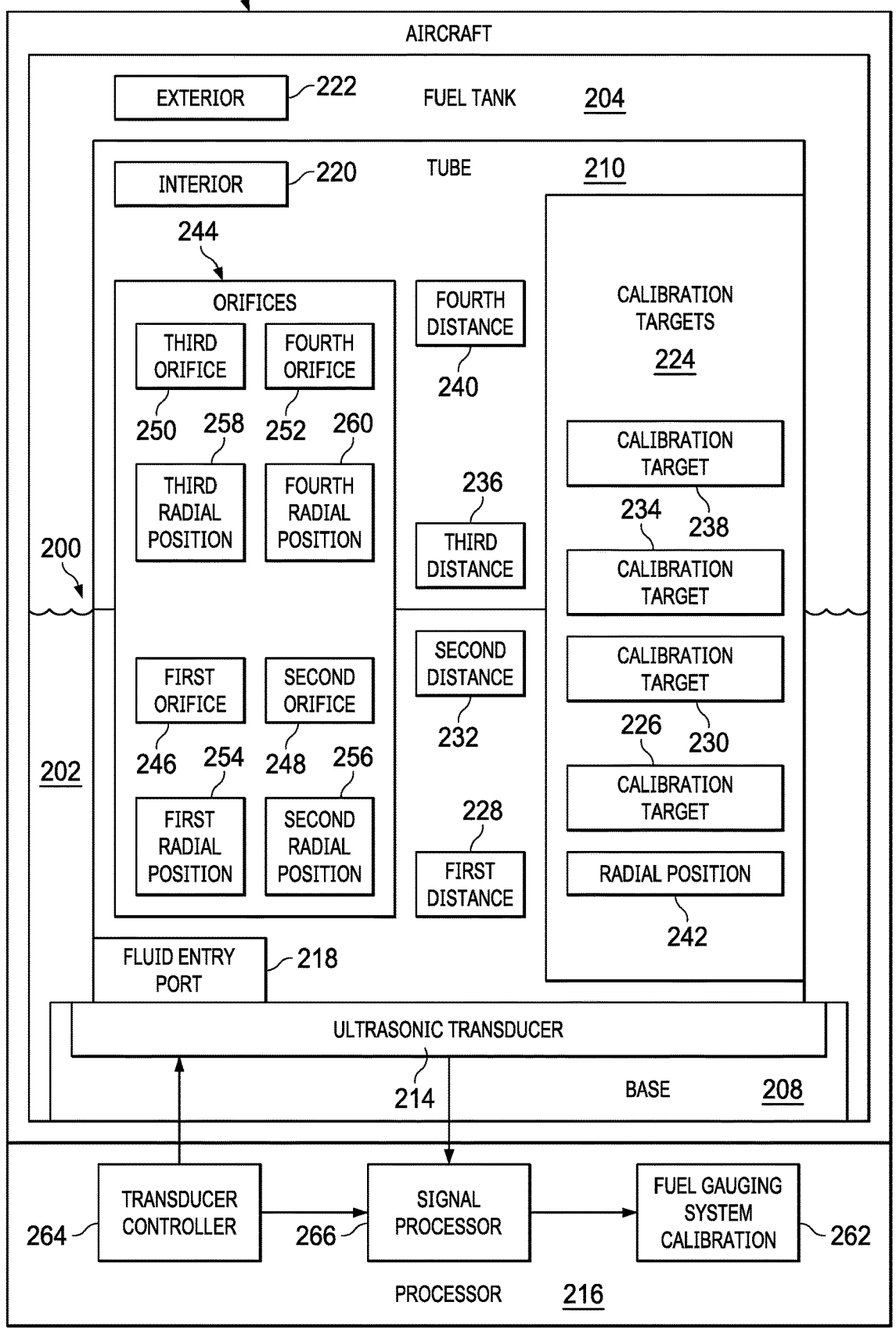
FIG. 2 is an illustration of a block diagram of an ultrasonic fluid measurement calibration probe in accordance with an illustrative embodiment.

Turning to FIG. 2, an illustration of a block diagram of an ultrasonic fluid measurement calibration probe is depicted in accordance with an illustrative embodiment. Probe 200 may be used to calibrate a system for determining the quantity of fuel 202 in fuel tank 204. In this case, probe 200 may be referred to as an ultrasonic fuel measurement calibration probe or an ultrasonic fuel gauging calibration probe.

Probe 200 may be used to calibrate a system for determining the quantity of fuel 202 in fuel tank 204 on aircraft 206. Aircraft 206 may comprise any appropriate type of vehicle that is configured to operate in the air. For example, without limitation, aircraft 206 may be a commercial passenger aircraft, a transportation aircraft, a military aircraft, a personal aviation aircraft, or any other type of aircraft configured to perform any appropriate operation or mission.

Alternatively, or in addition, probe 200 may be used to calibrate a system for determining the quantity of fuel 202 in fuel tank 204 on a vehicle other than aircraft 206 or on any appropriate platform other than a vehicle. Alternatively, or in addition, probe 200 may be used to calibrate a system for determining the quantity of a fluid other than fuel 202 in a container or environment other than fuel tank 204. For example, without limitation, probe 200 in accordance with an illustrative embodiment may be used to calibrate a system for determining the quantity water in a water tank, fluid waste in a waste tank, or any other appropriate fluid in any other appropriate container or environment.

Probe 200 may comprise base 208 and tube 210. Base 208 may comprise ultrasonic transducer 214.

Ultrasonic transducer 214 may be mounted inside base 208 in any appropriate manner. For example, without limitation, ultrasonic transducer 214 may comprise a piezoelectric transducer that is glued in a transducer chamber inside base 208 using any appropriate adhesive.

Alternatively, ultrasonic transducer 214 may comprise any other appropriate transducer that may be mounted in or to base 208 using any other appropriate method, material, or structure.

Ultrasonic transducer 214 may be connected in communication with processor 216 in any appropriate manner such that processor 216 may control operation of ultrasonic transducer 214 and receive information from ultrasonic transducer 214. For example, without limitation, ultrasonic transducer 214 may be connected to processor 216 by appropriate electrical wiring. Alternatively, ultrasonic transducer 214 may be in wireless communication with processor 216. For example, without limitation, base 208 may comprise an appropriate wireless receiver and transmitter that may be connected to ultrasonic transducer 214 to provide wireless communication between ultrasonic transducer 214 and processor 216.

Tube 210 is attached to base 208 such that an ultrasonic signal generated by ultrasonic transducer 214 is directed into tube 210. Tube 210 may be attached to base 208 in any appropriate manner. Fluid entry port 218 may be formed in tube 210 at or near where tube 210 is attached to base 208. Fluid entry port 218 may be configured in any appropriate manner to allow a fluid, such as fuel 202, to enter interior 220 of tube 210 from exterior 222 of tube 210 when probe 200 is placed in the fluid.

Calibration targets 224 may be attached to tube 210 at various known distances along tube 210 from ultrasonic transducer 214. Each of calibration targets 224 may extend into interior 220 of tube 210 such that an ultrasonic signal directed from ultrasonic transducer 214 into tube 210 may be reflected off of each of calibration targets 224 back toward ultrasonic transducer 214.

For example, calibration target 226 may be attached to tube 210 at first distance 228 from ultrasonic transducer 214. Calibration target 226 may be referred to as a first calibration target. Calibration target 230 may be attached to tube 210 at second distance 232 from ultrasonic transducer 214. Calibration target 230 may be referred to as a second calibration target. Calibration target 234 may be attached to tube 210 at third distance 236 from ultrasonic transducer 214. Calibration target 234 may be referred to as a third calibration target. Calibration target 238 may be attached to tube 210 at fourth distance 240 from ultrasonic transducer 214. Calibration target 238 may be referred to as a fourth calibration target. Illustrative embodiments may include more or fewer than four calibration targets 224.

All of calibration targets 224 may be at the same radial position 242 on tube 210. Alternatively, all of calibration targets 224 may be at different radial positions on tube 210. In a further alternative embodiment, some of calibration targets 224 may be at the same radial position 242 on tube 210 while one or more other ones of calibration targets 224 are at a different radial position 242 on tube 210.

In accordance with an illustrative embodiment, orifices 244 may be formed in tube 210 in various positions along the length of tube 210. Orifices 244 may extend through tube 210 to allow a fluid, such as fuel 202, to enter into interior 220 of tube 210 from exterior 222 of tube 210 at various positions along the length of tube 210 such that the fluid on exterior 222 of tube 210 mixes with the fluid on interior 220 of tube 210.

Orifices 244 may be of any appropriate size and shape. For example, without limitation, orifices 244 may be in the form of elongated slots formed extending along the length of tube 210.

The positions of orifices 244 on tube 210 are preferably selected with respect to the positions of calibration targets 224 on tube 210 such that any reflection of the ultrasonic signals from ultrasonic transducer 214 off of orifices 244 are not confused with the reflections of such ultrasonic signals off of calibration targets 224. For example, without limitation, orifices 244 may be positioned on tube 210 such that the distances of edges of orifices 244 from ultrasonic transducer 214 correspond to the distances of calibration targets 224 from ultrasonic transducer 214. For example, in the case where orifices 244 are slots, such slots may be positioned on tube 210 such that the distances of ends of the slots from ultrasonic transducer 214 correspond to the distances of calibration targets 224 from ultrasonic transducer 214.

The positions of orifices 244 on tube 210 also are preferably selected to enhance the mixing of fluid on exterior 222 of tube 210 with the fluid on interior 220 of tube 210. For example, without limitation, orifices 244 may be positioned at various radial positions on tube 210 to enhance the flow of fluid from exterior 222 of tube 210 through interior 220 of tube 210.

For example, orifices 244 may include first orifice 246, second orifice 248, third orifice 250, and fourth orifice 252. Illustrative embodiments may include more or fewer than four orifices.

First orifice 246 may be at first radial position 254 on tube 210 and may extend along the length of tube 210 from first distance 228 from ultrasonic transducer 214 to second distance 232 from ultrasonic transducer 214. Therefore, the distances of edges of first orifice 246 from ultrasonic transducer 214 may be the same as the distances of calibration target 226 and calibration target 230 from ultrasonic transducer 214. Second orifice 248 may be at second radial position 256 on tube 210 and may also extend along the length of tube 210 from first distance 228 from ultrasonic transducer 214 to second distance 232 from ultrasonic transducer 214. Therefore, the distances of edges of second orifice 248 from ultrasonic transducer 214 may be the same as the distances of calibration target 226 and calibration target 230 from ultrasonic transducer 214. First radial position 254 of first orifice 246 on tube 210 may be opposite second radial position 256 of second orifice 248 on tube 210 to enhance the flow of fluid from exterior 222 of tube 210 through interior 220 of tube 210 via first orifice 246 and second orifice 248.

Third orifice 250 may be at third radial position 258 on tube 210 and may extend along the length of tube 210 from third distance 236 from ultrasonic transducer 214 to fourth distance 240 from ultrasonic transducer 214. Therefore, the distances of edges of third orifice 250 from ultrasonic transducer 214 may be the same as the distances of calibration target 234 and calibration target 238 from ultrasonic transducer 214. Fourth orifice 252 may be at fourth radial position 260 on tube 210 and may also extend along the length of tube 210 from third distance 236 from ultrasonic transducer 214 to fourth distance 240 from ultrasonic transducer 214. Therefore, the distances of the edges of fourth orifice 252 from ultrasonic transducer 214 may be the same as the distances of calibration target 234 and calibration target 238 from ultrasonic transducer 214. Third radial position 258 of third orifice 250 on tube 210 may be opposite fourth radial position 260 of fourth orifice 252 on tube 210 to enhance the flow of fluid from exterior 222 of tube 210 through interior 220 of tube 210 via third orifice 250 and fourth orifice 252.

For example, without limitation, probe 200 may be used to calibrate a system for determining the quantity of fuel 202 in fuel tank 204 by attaching base 208 of probe 200 to bottom 262 of fuel tank 204 such that tube 210 extends upward from bottom 262 of fuel tank 204. For example, without limitation, probe 200 may be attached to bottom 262 of fuel tank 204 by using any appropriate fasteners to attach base 208 to bottom 262 of fuel tank 204. With probe 200 attached to bottom 262 of fuel tank 204, fuel 202 in fuel tank 204 may enter interior 220 of tube 210 through fluid entry port 218 and orifices 244 and rise to a level corresponding to the level of fuel 202 in fuel tank 204.

Processor 216 may comprise transducer controller 264 and signal processor 266. Transducer controller 264 may be configured to send a signal to ultrasonic transducer 214 to cause ultrasonic transducer 214 to generate an ultrasonic signal that is directed through fuel 202 in interior 220 of tube 210 and is reflected off calibration targets 224 that are below the level of fuel 202 in tube 210. The reflected ultrasonic signals from calibration targets 224 are directed through tube 210 back to ultrasonic transducer 214. Ultrasonic transducer 214 sends a signal back to processor 216 in response to receiving the reflected ultrasonic signals. Signal processor 266 in processor 216 may then process the signal received from ultrasonic transducer 214 in a known manner to provide fuel gauging system calibration 270.

The illustration of ultrasonic fuel measurement calibration probe 200 in FIG. 2 is not meant to imply physical or architectural limitations to the manner in which illustrative embodiments may be implemented. Other components, in addition to or in place of the ones illustrated, may be used. Some components may be optional. Also, the blocks are presented to illustrate some functional components. One or more of these blocks may be combined, divided, or combined and divided into different blocks when implemented in an illustrative embodiment.

Figure 3:
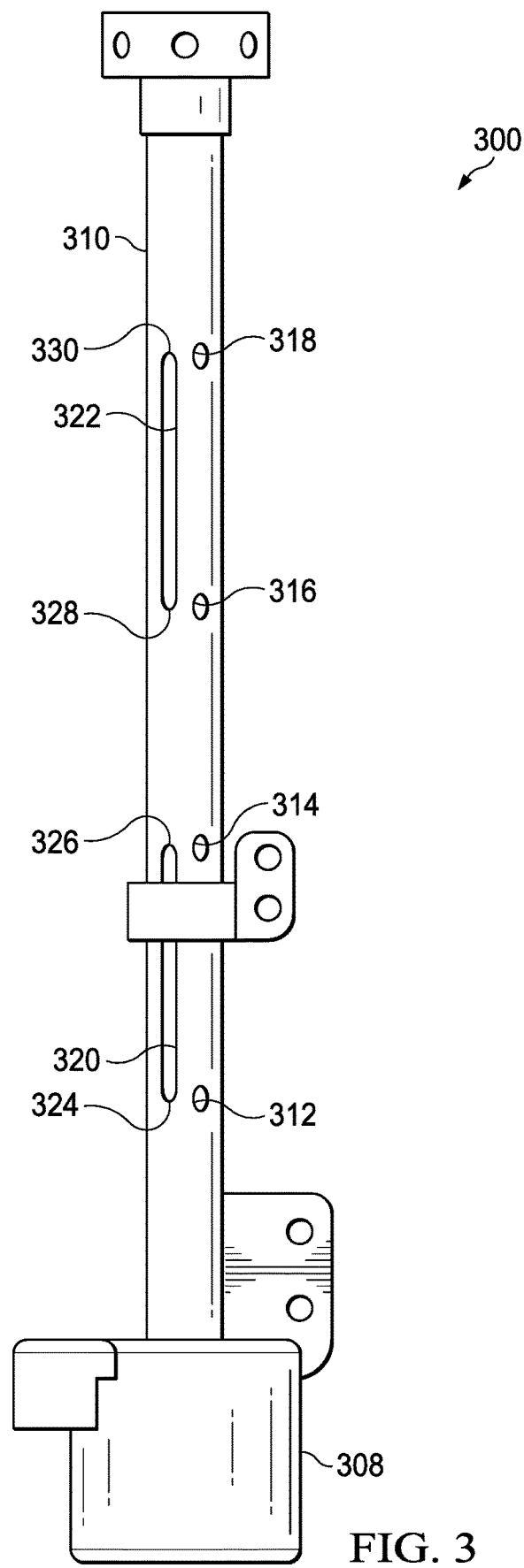
FIG. 3 is an illustration of a side view of an ultrasonic fuel gauging calibration probe in accordance with an illustrative embodiment.

Turning to FIG. 3, an illustration of a side view of an ultrasonic fluid measurement calibration probe is depicted in accordance with an illustrative embodiment. Probe 300 may be an example of one implementation of probe 200 in FIG. 2.

Probe 300 may comprise base 308 and tube 310. An ultrasonic transducer, not shown in FIG. 3, may be mounted inside base 308. Tube 310 is attached to base 308 such that an ultrasonic signal generated by the ultrasonic transducer in base 308 is directed into tube 310.

Calibration targets 312, 314, 316, and 318 are attached to tube 310 at various known distances along tube 310 from base 308. Each of calibration targets 312, 314, 316, and 318 may extend into tube 310 such that an ultrasonic signal directed from the ultrasonic transducer in base 308 into tube 310 may be reflected off of each of calibration targets 312, 314, 316, and 318 that is below the level of fluid in tube 310 back toward the ultrasonic transducer in base 308.

Slots 320 and 322 are formed in tube 310. Slots 320 and 322 are examples of possible implementations of orifices 244 in FIG. 2. Slots 320 and 322 extend through tube 310 to allow a fluid to enter into tube 310 at various positions along the length of tube 310 such that fluid outside of tube 310 mixes with the fluid inside of tube 310. Illustrative embodiments may include more or fewer than two slots.

Slot 320 extends along the length of tube 310 from the distance of calibration target 312 from base 308 to the distance of calibration target 314 from base 308. For example, without limitation, rounded end 324 of slot 320 may be at the same distance from base 308 as calibration target 312. Rounded end 326 of slot 320 may be at the same distance from base 308 as calibration target 314.

Slot 322 extends along the length of tube 310 from the distance of calibration target 316 from base 308 to the distance of calibration target 318 from base 308. For example, without limitation, rounded end 328 of slot 322 may be at the same distance from base 308 as calibration target 316. Rounded end 330 of slot 322 may be at the same distance from base 308 as calibration target 318.

Figure 4:
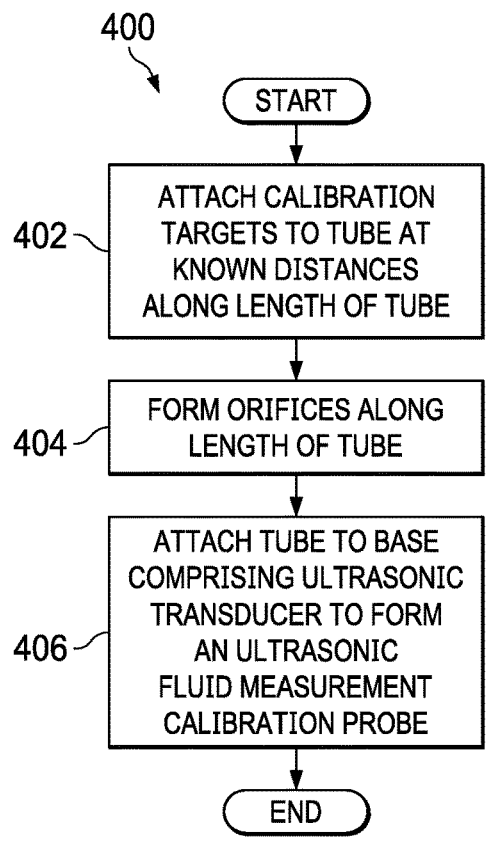
FIG. 4 is an illustration of a flowchart of a method of making an ultrasonic fluid measurement calibration probe in accordance with an illustrative embodiment.

Turning to FIG. 4, an illustration of a flowchart of a method of making an ultrasonic fluid measurement calibration probe is depicted in accordance with an illustrative embodiment. Process 400 may be an example of a process for making ultrasonic fluid measurement calibration probe 200 in FIG. 2.

Process 400 may begin with attaching calibration targets to a tube at known distances along the length of the tube (operation 402). Orifices may then be formed along the length of the tube (operation 404). The tube may be attached to a base comprising an ultrasonic transducer to form an ultrasonic fluid measurement calibration probe (operation 406), with the process terminating thereafter.

Figure 5:
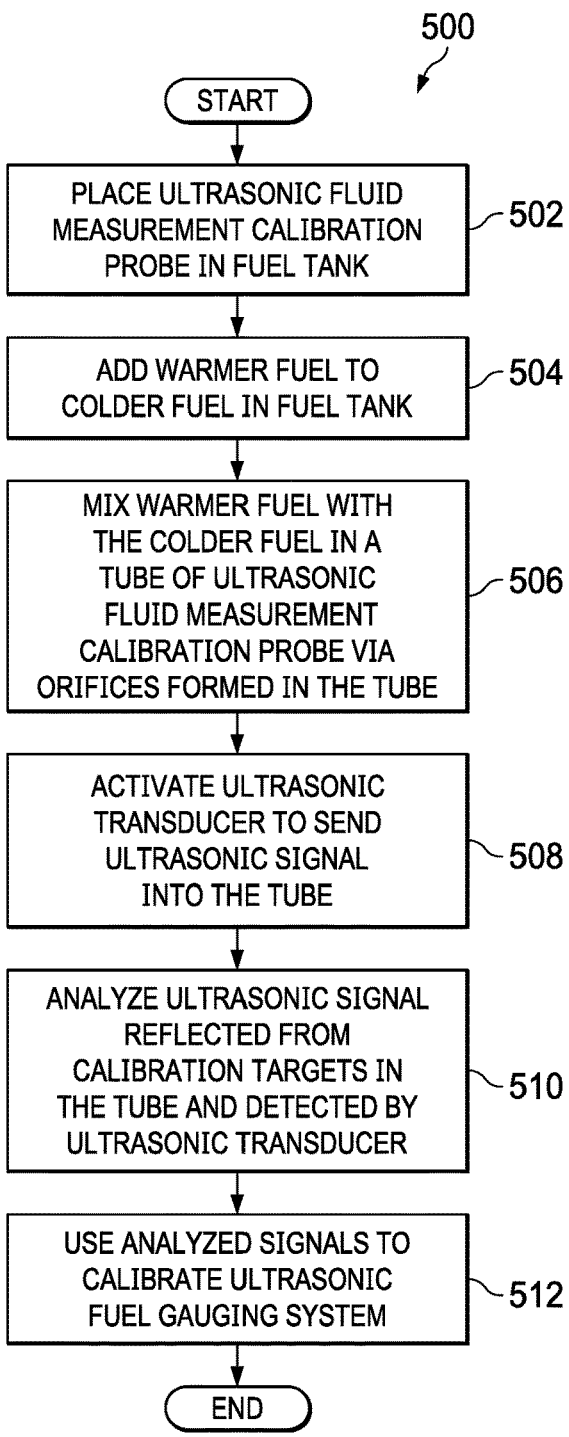
FIG. 5 is an illustration of a flowchart of a method of calibrating an ultrasonic fuel gauging system in accordance with an illustrative embodiment.

Turning to FIG. 5, an illustration of a flowchart of a method of calibrating an ultrasonic fluid measurement system is depicted in accordance with an illustrative embodiment. Process 500 may be implemented, for example, using ultrasonic fluid measurement calibration probe 200 in FIG. 2.

Process 500 may begin with placing an ultrasonic fluid measurement calibration probe in a fuel tank on an aircraft (operation 502). During a flight, the fuel in the fuel tank may be cooled. During a refueling operation, warmer fuel may be added to the colder fuel in the fuel tank (operation 504). The warmer fuel is mixed with the colder fuel in a tube of the ultrasonic fluid measurement calibration probe via orifices formed in the tube (operation 506). The ultrasonic transducer in the ultrasonic fluid measurement calibration probe may then be activated to send an ultrasonic signal into the tube (operation 508). The ultrasonic signal reflected from calibration targets in the tube and detected by the ultrasonic transducer may then be analyzed (operation 510). The analyzed signals may then be used to calibrate an ultrasonic fuel gauging system for measuring the amount of fuel in the fuel tank (operation 512), with the process terminating thereafter.

The flowcharts and block diagrams described herein illustrate the architecture, functionality, and operation of possible implementations of systems and methods according to various illustrative embodiments. It should also be noted that, in some alternative implementations, the operation noted in a block may occur out of the order noted in the figures. For example, the operations of two blocks shown in succession may be performed substantially concurrently, or the operations of the blocks may sometimes be performed in the reverse order, depending upon the functionality involved.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. An apparatus, comprising:
   a base comprising an ultrasonic transducer;
   a tube extending from the base;
   a first calibration target attached to a side of the tube at a first distance from the ultrasonic transducer and extending radially into an interior of the tube; and
   an orifice in the side of the tube, wherein the orifice extends through the side of the tube from an exterior of the tube to the interior of the tube and along the tube wherein an edge of the orifice is at the first distance from the ultrasonic transducer.

2. The apparatus of claim 1 further comprising:
   a second calibration target attached to the side of the tube at a second distance from the ultrasonic transducer and extending radially into the interior of the tube; and
   wherein the orifice comprises a first slot that extends along the tube from the first distance from the ultrasonic transducer to the second distance from the ultrasonic transducer.

3. The apparatus of claim 2, wherein:
   the first calibration target and the second calibration target are at a same radial position on the tube; and
   the first slot is at a first radial position on the tube that is different from the same radial position of the first calibration target and the second calibration target.

4. The apparatus of claim 3 further comprising a second orifice in the side of the tube at a second radial position on the tube that is different from both the first radial position and the same radial position of the first calibration target and the second calibration target.

5. The apparatus of claim 4, wherein the second radial position is opposite the first radial position on the tube.

6. The apparatus of claim 4 further comprising:
   a third calibration target attached to the side of the tube at a third distance from the ultrasonic transducer and extending radially into the interior of the tube; and
   a fourth calibration target attached to the side of the tube at a fourth distance from the ultrasonic transducer and extending radially into the interior of the tube;
   wherein the second orifice comprises a second slot that extends through the tube from the exterior of the tube to the interior of the tube and along the tube from the third distance from the ultrasonic transducer to the fourth distance from the ultrasonic transducer.

7. The apparatus of claim 1, wherein the orifice is a slot and the edge of the orifice at the first distance from the ultrasonic transducer is a rounded end of the slot.

8. A method of making an ultrasonic fluid measurement calibration probe, comprising:

attaching a first calibration target to a side of a tube at a first distance from an end of the tube and extending radially into an interior of the tube;

forming an orifice in the side of the tube, wherein the orifice extends through the side of the tube from an exterior of the tube to the interior of the tube and along the tube wherein an edge of the orifice is at the first distance from the end of the tube; and attaching the end of the tube to a base comprising an ultrasonic transducer.

9. The method of claim 8 further comprising:

attaching a second calibration target to the side of the tube at a second distance from the end of the tube and extending radially into the interior of the tube; and forming a first slot from the orifice to extend along the tube from the first distance from the end of the tube to the second distance from the end of the tube.

10. The method of claim 9, wherein:

attaching the first calibration target to the tube and attaching the second calibration target to the tube comprises attaching the first calibration target and the second calibration target to the tube at a same radial position on the tube; and forming the orifice comprises forming the orifice at a first radial position on the tube that is different from the same radial position of the first calibration target and the second calibration target.

11. The method of claim 10 further comprising forming a second orifice in the side of the tube at a second radial position on the tube that is different from both the first radial position and the same radial position of the first calibration target and the second calibration target.

12. The method of claim 11, wherein the second radial position is opposite the first radial position on the tube.

13. The method of claim 11 further comprising:

attaching a third calibration target to the side of the tube at a third distance from the end of the tube and extending radially into the interior of the tube; and attaching a fourth calibration target to the side of the tube at a fourth distance from the end of the tube and extending radially into the interior of the tube;

wherein the second orifice comprises a second slot that extends through the tube from the exterior of the tube to the interior of the tube and along the tube from the third distance from the end of the tube to the fourth distance from the end of the tube.

14. The method of claim 8, wherein the orifice comprises a slot and wherein the edge of the orifice at the first distance from the end of the tube comprises a rounded end of the slot.

15. A method of calibrating an ultrasonic fuel gauging system, comprising:

placing an ultrasonic fuel gauging calibration probe in a fuel tank, wherein the ultrasonic fuel gauging calibration probe comprises a tube attached to a base comprising an ultrasonic transducer and a first calibration target attached to a side of the tube at a first distance from an end of the tube and extending radially into an interior of the tube;

mixing fuel from the fuel tank with fuel inside the tube via an orifice in the side of the tube, wherein the orifice extends through the side of the tube from an exterior of the tube to the interior of the tube and along the tube wherein an edge of the orifice is at the first distance from the end of the tube;

activating the ultrasonic transducer to send an ultrasonic signal into the tube;

analyzing the ultrasonic signal reflected from the first calibration target and detected by the ultrasonic transducer; and using the analyzed signal to calibrate the ultrasonic fuel gauging system.

16. The method of claim 15, wherein the fuel tank is a fuel tank on an aircraft.

17. The method of claim 15, wherein the ultrasonic fuel gauging calibration probe comprises:

a second calibration target attached to the side of the tube at a second distance from the ultrasonic transducer and extending radially into the interior of the tube; and wherein the orifice comprises a first slot extending along the tube from the first distance from the ultrasonic transducer to the second distance from the ultrasonic transducer.

18. The method of claim 17, wherein:

the first calibration target and the second calibration target are at a same radial position on the tube; and the slot is at a first radial position on the tube that is different from the same radial position of the first calibration target and the second calibration target.

19. The method of claim 18 wherein a second slot is at a second radial position on the tube that is different from both the first radial position and the same radial position of the first calibration target and the second calibration target.

20. The method of claim 19, wherein the second radial position is opposite the first radial position on the tube.

* * * * *